United States Patent
Takahashi

(10) Patent No.: US 7,191,323 B2
(45) Date of Patent: Mar. 13, 2007

(54) INFORMATION PROCESSING UNIT SELECTING ONE OF RESET VECTOR ADDRESSES

(75) Inventor: Hiroki Takahashi, Tokyo (JP)

(73) Assignee: Renesas Technology Corp., Tokyo (JP)

( * ) Notice: Subject to any disclaimer, the term of this patent is extended or adjusted under 35 U.S.C. 154(b) by 705 days.

(21) Appl. No.: 10/157,884

(22) Filed: May 31, 2002

(65) Prior Publication Data

US 2004/0078664 A1   Apr. 22, 2004

(30) Foreign Application Priority Data

Nov. 28, 2001   (JP) .............................. 2001-363257

(51) Int. Cl.
*G06F 9/06* (2006.01)
(52) U.S. Cl. ........................................................ 713/1
(58) Field of Classification Search ................ 713/100, 713/601
See application file for complete search history.

(56) References Cited

U.S. PATENT DOCUMENTS

| | | | |
|---|---|---|---|
| 5,097,413 A | | 3/1992 | Mensch, Jr. |
| 5,884,059 A | * | 3/1999 | Favor et al. ................. 712/215 |
| 6,587,916 B2 | * | 7/2003 | Hongo et al. ................ 711/103 |
| 6,704,865 B1 | | 3/2004 | Duff |
| 6,748,545 B1 | * | 6/2004 | Helms ......................... 713/300 |

FOREIGN PATENT DOCUMENTS

| | | |
|---|---|---|
| DE | 10064025 A1 | 6/2001 |
| JP | 1-201762 | 8/1989 |
| JP | 3-149620 | 6/1991 |
| JP | 11-31068 | 2/1999 |
| JP | 2000-112576 | 4/2000 |
| KR | 2000-0037166 | 5/2002 |

* cited by examiner

*Primary Examiner*—Rehana Perveen
*Assistant Examiner*—Eric Chang
(74) *Attorney, Agent, or Firm*—Buchanan Ingersoll & Rooney PC

(57) ABSTRACT

An information processing unit selects one of a plurality of reset vector addresses, and executes an instruction in accordance with the reset vector address selected. A reset memory circuit latches after switch-on a predetermined value as a latch value regardless of a reset signal supplied via a reset terminal. When the reset memory circuit has latched the latch value, an address selection circuit selects one of the reset vector addresses in response to a logical AND of the latch value and a selection signal supplied via a selection terminal. The information processing unit can prevent changes in the reset vector address even though the potential at the reset terminal fluctuates slightly after the switch-on.

7 Claims, 4 Drawing Sheets

INFORMATION PROCESSING UNIT SELECTING ONE OF RESET VECTOR ADDRESSES

BACKGROUND OF THE INVENTION

1. Field of the Invention

The present invention relates to an information processing unit such as a central processing unit (CPU), and more particularly to an information processing unit for performing switching control of reset vector addresses at reset processing.

2. Description of Related Art

Generally speaking, a CPU clears its various types of registers such as a built-in program counter into their initial state by receiving a reset signal, and starts its operation by reading an instruction from a specified address on its memory, a reset vector address.

Conventionally, the reset vector address the CPU generates is fixed for the CPU. Specifically, the CPU has one reset vector address, and always starts its program from the same address in response to the reset signal. For example, the CPU enters a reset state when its reset terminal is placed at a low level. Subsequently, when the reset terminal is returned to a high level, the reset is released so that the CPU starts to execute the program from the reset vector address (for example, "FFFC"). More specifically, the CPU reads an instruction from the address "FFFC", puts it into the built-in program counter, and executes the program sequentially.

However, since the conventional CPU has the fixed reset vector address, it has a problem in that it cannot reflect the condition, in which the reset takes place, onto the operation after the reset is released. For example, consider the case where hardware is faulty which is used by the program the CPU executes from the fixed reset vector address after the reset processing. When the CPU proceeds with the program from the reset vector address, and enters the reset state at the time when the program accesses the faulty hardware, the CPU executes the program that uses the faulty hardware from the same reset vector address, again. Thus, the CPU is reset at the same location, thereby iterating its operation.

To prevent the foregoing problem, some conventional techniques are proposed such as those disclosed in Japanese patent application laid-open Nos. 1-201762 and 11-31068, for example.

The conventional techniques select one of a plurality of reset vector addresses in response to a voltage level or by selecting an external pin at the reset.

FIG. 7 is a circuit diagram showing a configuration of a conventional CPU, which enables the selection of one of the plurality of reset vector addresses. In FIG. 7, the reference numeral 11 designates a CPU including a reset terminal 11*a* and a reset selection terminal 11*b*. The reference numeral 12 designates an address selection circuit connected to the reset terminal 11*a* and reset selection terminal 11*b*.

Next, the operation of the conventional CPU will be described.

In response to a reset signal (low level) supplied to the reset terminal 11*a*, an inverter 12*a* outputs a high-level signal. In this case, when a voltage Vss (low level) is applied to the reset selection terminal 11*b*, the inverter 12*b* outputs a high-level signal, so that an AND gate 12*c* outputs a high-level signal. Thus, the address selection circuit 12 selects the address "FFFC". In other words, in response to the reset signal and voltage Vss supplied to the reset terminal 11*a* and reset selection terminal 11*b*, respectively, the address selection circuit 12 selects the address "FFFC".

Then, after the reset release, the CPU 11 generates the address "FFFC" as the reset vector address, reads the instruction (for example, "C000") from the address "FFFC", and sets it into the program counter (not shown). Thus, the CPU 11 executes the program from "C000".

On the other hand, when the reset selection terminal 11*b* is connected to a supply voltage Vcc (high-level signal), another AND gate 12*d* outputs a high-level signal because the inverter 12*a* outputs the high-level signal. Thus, the address selection circuit 12 selects an address "FF0C". Then, after the reset is released, the CPU 11 generates the address "FF0C" as the reset vector address, reads the instruction (for example, "D000") from the address "FF0C", and sets it in the program counter. Thus, the CPU 11 executes the program from "D000".

In this way, the CPU 11 selects one of the plurality of the reset vector addresses in response to the potential applied to the reset selection terminal 11*b*, and executes the program in accordance with the reset vector address.

With the foregoing configuration, the conventional information processing unit can select the reset vector address in response to the potential supplied to the reset selection terminal 11*b*. However, it has a problem in that the reset vector address to be selected can be changed by slight fluctuations in the potential at the reset terminal 11*a* after the switch-on. As a result, there is a problem in that a program an operator does not expect is likely to be executed.

For example, assume that the program beginning from the address "C000" is for a destination A, and the program beginning from the address "D000" is for a destination B. In this case, the execution of the program is determined by the setting at turn-on. If the potential of the reset terminal 11*a* fluctuates even slightly after the power-up, the reset vector address to be selected can change regardless of the potential at the reset selection terminal 11*b*. For example, even when the program corresponding to the destination A must be executed after the power-up, the program corresponding to the destination B can be executed because of the change of the reset vector address owing to the slight fluctuations in the potential at the reset terminal 11*a*.

Furthermore, since the conventional information processing unit is configured such that it selects one of the reset vector addresses in response to the levels of the external terminals such as the reset terminal 11*a* and reset selection terminal 11*b*, it has a problem in that it cannot select the reset vector address in response to software reset.

In addition, the conventional information processing unit has another problem of being unable to select the reset vector address in response to the reset processing either at turn-on or at operation of the CPU 11.

SUMMARY OF THE INVENTION

The present invention is implemented to solve the foregoing problems. It is therefore an object of the present invention to provide an information processing unit capable of preventing the reset vector address from being changed even though small potential fluctuations take place at the reset terminal after switch-on.

Another object of the present invention is to provide an information processing unit capable of selecting the reset vector address in accordance with the type of the reset processing, whether it is carried out at turn-on or during operation.

According to one aspect of the present invention, there is provided an information processing unit including storing means for storing reset associated information; and selecting means for selecting one of reset vector addresses in accordance with the reset associated information.

Here, the storing means may include a latch circuit for latching a predetermined value as a latch value at turn-on; and the selecting means may select one of the reset vector addresses in response to the latch value and the selection signal supplied via a reset selection terminal. This offers an advantage of being able to prevent the reset vector address selected from being changed by slight potential fluctuations at the reset terminal after the turn-on.

The storing means may include a processor mode register for storing a software reset bit, and the selecting means may select one of different reset vector addresses depending on a reset processing by the reset signal and a reset processing by processor mode register. This offers an advantage of being able to select a different reset vector address in response to the hardware reset or software reset.

The storing means may include a register in the information processing unit for storing a cold start/warm start decision flag, and the selecting means may select one of the reset vector addresses in response to the cold/warm decision signal when the reset signal is supplied. This offers an advantage of being able to select a different reset vector address in response to the reset processing at turn-on or to the reset processing during the operation of the information processing unit.

DETAILED DESCRIPTION OF THE PREFERRED EMBODIMENTS

The invention will now be described with reference to the accompanying drawings.

Embodiment 1

Figure 1:
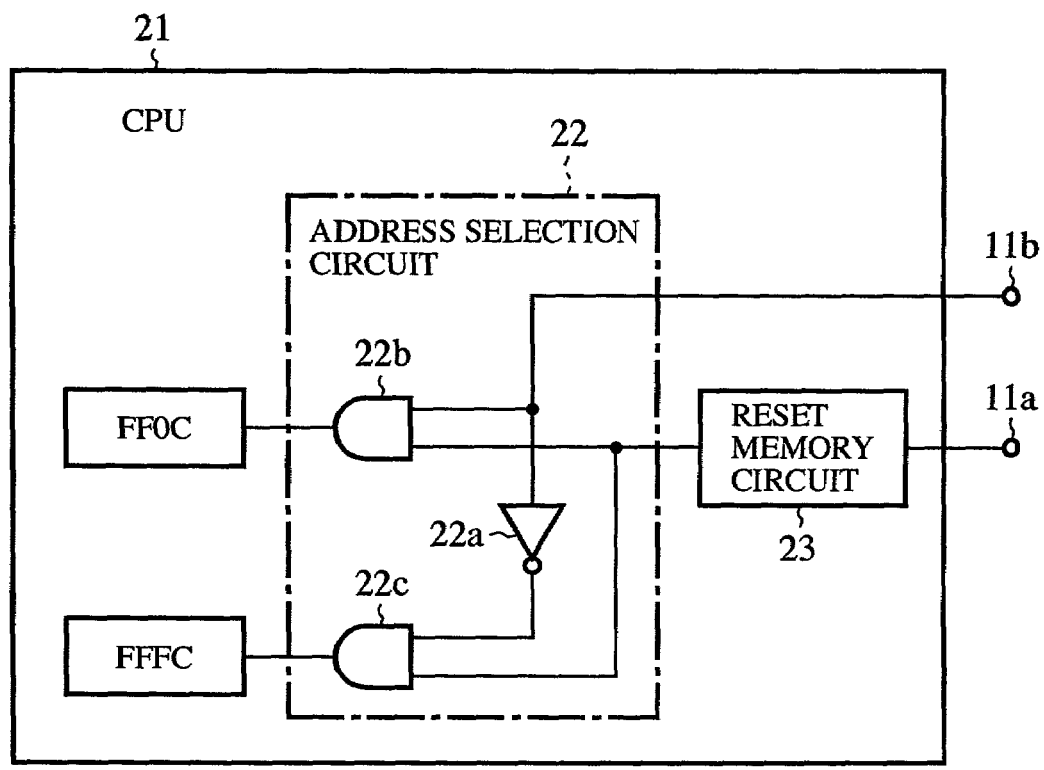
FIG. 1 is a circuit diagram showing a configuration of an embodiment 1 of the information processing unit in accordance with the present invention.

FIG. 1 is a circuit diagram showing a configuration of an embodiment 1 of the information processing unit in accordance with the present invention, which shows only a portion relevant to the present invention. In FIG. 1, the reference numeral 21 designates a CPU (information processing unit); 22 designates an address selection circuit; and 23 designates a reset memory circuit. The address selection circuit 22 comprises an inverter 22a, and AND gates 22b and 22c. The reset memory circuit 23 is supplied with the reset signal from the reset terminal 11a. The address selection circuit 22, receiving the reset selection signal from the reset selection terminal 11b, selects the reset vector address as will be described later.

Figure 2:
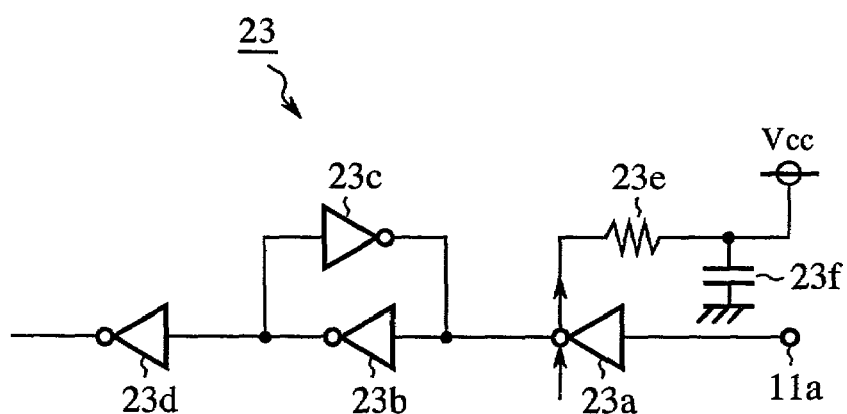
FIG. 2 is a circuit diagram showing a configuration of the reset memory circuit of FIG. 1.

FIG. 2 is a circuit diagram showing the reset memory circuit 23 as shown in FIG. 1. As shown in FIG. 2, the reset memory circuit 23 is connected to the reset terminal 11a and a supply voltage Vcc. The reset memory circuit 23 includes inverters 23a–23d, a resistor 23e, and a capacitor 23f. The inverter 23c is the so-called weak inverter with driving power smaller than that of the other inverters. The supply voltage Vcc is supplied to the output terminal of the inverter 23a through the resistor 23e. The inverter 23a has its input terminal connected to the reset terminal 11a, and its output terminal connected to the inverters 23b and 23d successively. In addition, the inverter 23c is connected across the output terminal and input terminal of the inverter 23b so that the output of the inverter 23b is fed back to its input side via the inverter 23c.

Next, the operation of the present embodiment 1 will be described.

The CPU 21 enters the reset state when the reset terminal 11a is placed at the low level for a predetermined time period, for example. Subsequently, the reset is released when the reset terminal 11a is returned to the high level.

When switched on, the supply voltage reaches the voltage Vcc after a predetermined time period. When the supply voltage has reached Vcc, the reset memory circuit 23 outputs a fixed value (high-level voltage, for example) as a latch value regardless of the potential at the reset terminal 11a.

After the power-up, in response to the voltage Vss (low level selection signal) supplied to the reset selection terminal 11b, the inverter 22a outputs a high-level signal, and hence the AND gate 22c outputs a high-level signal, thereby selecting the address "FFFC". Thus, when the voltage Vss is supplied to the reset selection terminal 11b after power-up, the address selection circuit 22 selects the address "FFFC". Then, the CPU 21 generates the address "FFFC" as the reset vector address, reads the instruction (for example, "C000") from the address "FFFC", and sets it to the program counter (not shown). Thus, the CPU 21 executes the program from "C000".

On the other hand, when the reset selection terminal 11b is connected to the supply voltage Vcc (high-level signal) at the power-up, the AND gate 22b outputs the high-level signal. Thus, the address selection circuit 22 selects the address "FF0C" so that the CPU 21 generates the address "FF0C" as the reset vector address, reads the instruction (for example, "D000") from the address "FF0C", and sets it into the program counter. Thus, the CPU 21 executes the program from "D000".

In this way, the CPU 21 selects one of the reset vector addresses as the selection reset vector address in response to the potential supplied to the reset selection terminal 11b at the power-up (after turn-on), and executes the program in accordance with the selection reset vector address after the power-up. In this case, the reset memory circuit 23 latches the predetermined value as the latch value after the power-up. In other words, when the predetermined value is latched as the latch value after the power-up, the reset memory circuit 23 selects one of the reset vector addresses as the selection reset vector address in response to the level (selection signal) applied at the reset selection terminal 11b, regardless of the reset signal. Accordingly, even when the potential at the reset terminal 11a fluctuates slightly (for such a short time period that does not bring the CPU 21 into the reset state), the latch value the reset memory circuit 23 latches is maintained so that the reset vector address is not changed. As a result, the CPU 21 does not execute a program an operator does not expect.

Next, consider the case where the reset terminal 11*a* is placed at the low level for a predetermined time period so that the CPU 21 is brought into the reset state, and subsequently, the reset terminal 11*a* is placed at the high level again to release the reset state of the CPU 21. In this case also, since the latch value of the reset memory circuit 23 is unchanged after the power-up, the CPU 21 can select the reset vector address in response to the potential at the reset selection terminal 11*b*.

As is clear from the foregoing description, the AND gates 22*b* and 22*c* function as a selecting means, and the reset memory circuit 23 function as a latch means.

As described above, the present embodiment 1 can prevent the reset vector address to be selected from being changed by the slight potential fluctuations at the reset terminal after the power-up. As a result, a program the operator does not expect is not executed.

Embodiment 2

Figure 3:
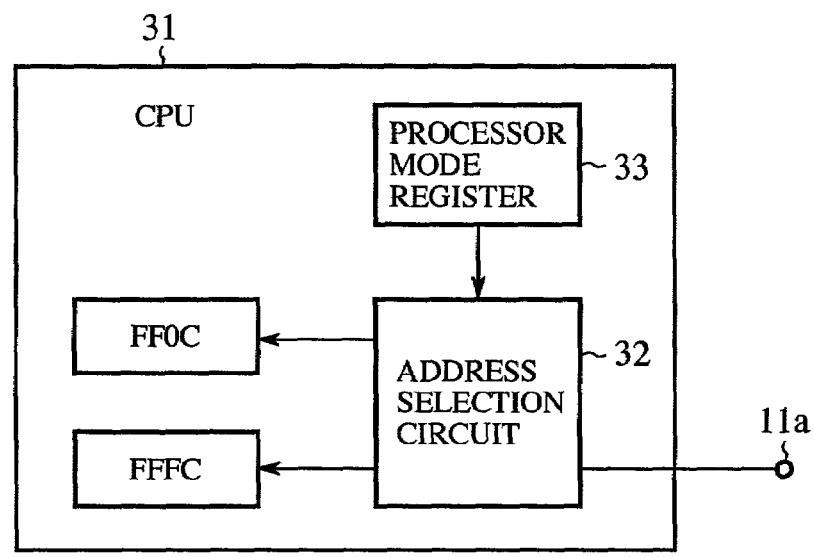
FIG. 3 is a circuit diagram showing a configuration of an embodiment 2 of the information processing unit in accordance with the present invention.

FIG. 3 is a block diagram showing a configuration of an embodiment 2 of the information processing unit in accordance with the present invention, which shows only a portion relevant to the present invention. In FIG. 3, the reference numeral 31 designates a CPU (information processing unit) including a plurality of the reset vector addresses. The CPU 31 undergoes so-called the hardware reset or software reset. In the hardware reset, the reset terminal 11*a* is placed at the low level for a predetermined time period to bring the CPU 31 into the reset state. Subsequently, when the reset terminal 11*a* is returned to the high level, the CPU 31 releases its reset state. The reference numeral 32 designates an address selection circuit for selecting one of the plurality of reset vector addresses in response to the hardware reset and software reset. The reference numeral 33 designates a processor mode register for setting the software reset state when its software reset bit is placed at "1".

More specifically, at the software reset, when a particular bit (software reset bit) of the processor mode register 33 is set at "1", for example, the CPU 31 is brought into the reset state. In contrast, when the software reset bit is set at "0", the reset is released. Thus, when the software reset bit is placed at "1", the CPU 31 enters the reset state by a software reset signal.

Next, the operation of the present embodiment 2 will be described.

First, when the reset terminal 11*a* is placed at the low level for the predetermined time period, the CPU 31 is brought into the reset state. Subsequently, when the reset terminal 11*a* is placed at the high level and the reset state is released, the CPU 31 selects the address "FFFC" through the address selection circuit 32. Thus, the CPU 31 selects the address "FFFC" in the hardware reset mode, and generates the address "FFFC" as the reset vector address after the reset is released. Thus, the CPU 31 reads the instruction (for example, "C000") from the address "FFFC", sets it to the program counter (not shown), and executes the program from "C000".

On the other hand, when the software reset bit of the processor mode register 33 is set at "1", the CPU 31 enters the reset state. Subsequently, when the software reset bit is placed at "0", the CPU 31 selects the address "FF0C" through the address selection circuit 32. In other words, in response to the software reset signal from the processor mode register 33, the CPU 31 selects the address "FF0C". Then, the CPU 31 generates the address "FF0C" as the reset vector address after the reset is released, reads the instruction (for example, "D000") from the address "FF0C", and sets it into the program counter. Thus, the CPU 31 executes the program from "D000".

In this way, the address selection circuit 32 selects the different address as the reset vector address in response to the hardware reset or the software reset. Thus, when routines (programs) different from each other are executed in the hardware reset and software reset, for example, the CPU 31 can execute the processing after the reset without checking whether the hardware reset or software reset has occurred.

Furthermore, since the initial set data is retained during the software reset, the initial set after the software reset becomes unnecessary by selecting the different address as the reset vector address in response to the hardware reset or software reset. Thus, the time needed for the initial set can be reduced.

As described above, the present embodiment 2 is configured such that it distinguishes the hardware reset and software reset, and selects one of the different reset vector addresses after the reset is released. As a result, the present embodiment 2 offers an advantage of being able to select the reset vector address in accordance with the hardware reset or software reset.

Embodiment 3

Figure 4:
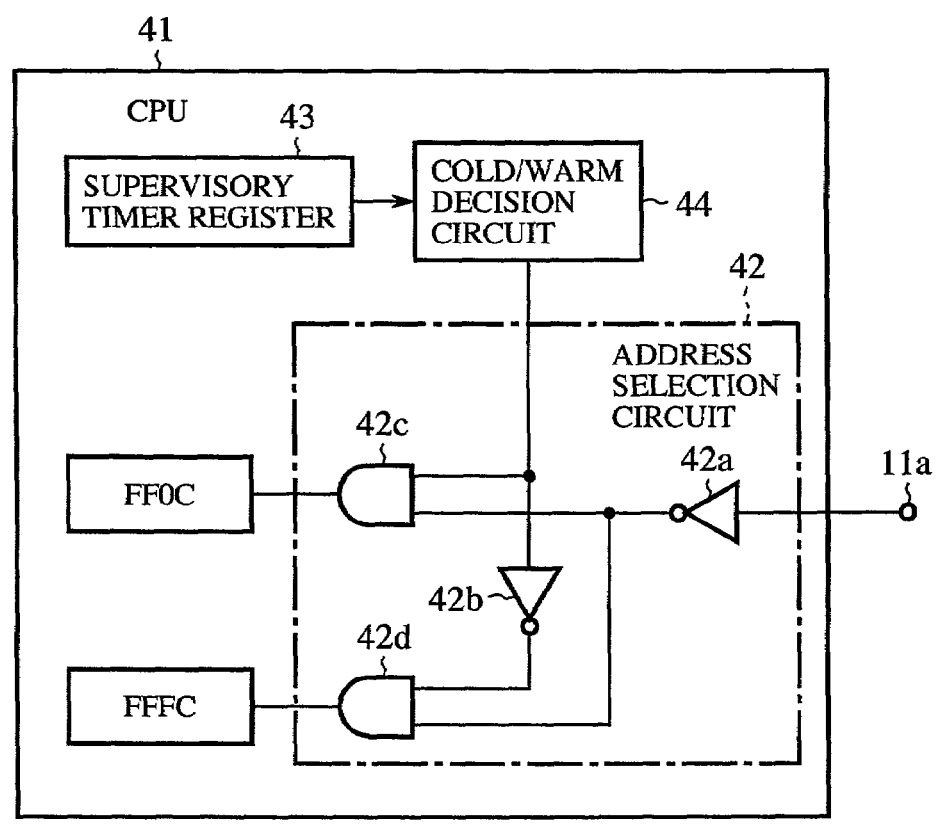
FIG. 4 is a circuit diagram showing a configuration of an embodiment 3 of the information processing unit in accordance with the present invention.

FIG. 4 is a circuit diagram showing a configuration of an embodiment 3 of the information processing unit in accordance with the present invention. FIG. 4 shows only a portion relevant to the present invention. In FIG. 4, the reference numeral 41 designates a CPU (information processing unit); and 42 designates an address selection circuit including inverters 42*a* and 42*b*, and AND gates 42*c* and 42*d*. The address selection circuit 42 selects the reset vector address in response to a cold/warm decision signal fed from a cold/warm decision circuit 44 and the reset signal fed from the reset terminal 11*a*.

The CPU 41 includes a supervisory timer register 43, a particular bit of which is reserved to set a cold start/warm start decision flag. The cold/warm decision circuit 44 makes a decision by the cold start/warm start decision flag as to whether the reset processing is associated with a cold start or a warm start. Here, the cold start refers to a start at the power-up, and the warm start refers to a start in response to the reset signal during operation of the CPU 41. The cold start/warm start decision flag is "0" at turn-on, and is made "1" when it is written into the supervisory timer register 43. Once the cold start/warm start decision flag has been written, it does not become "0" even though the software reset or the reset signal is input. However, the cold start/warm start decision flag enters a cold start ready mode when the supply voltage falls below a cold decision voltage, and is changed from "1" to "0" when the supply voltage increases at predetermined timing.

Next, the operation of the present embodiment 3 will be described.

Receiving the cold start/warm start decision flag from the supervisory timer register 43, the cold/warm decision circuit 44 supplies the cold/warm decision signal to the address selection circuit 42. When the cold/warm decision signal indicates the warm state, that is, when the cold/warm decision signal is "1" (high-level), and the reset terminal 11*a* is supplied with the reset signal (low level), the inverter 42*a* outputs a high-level signal and the AND gate 42c also outputs a high-level signal. Accordingly, the address selection circuit 42 selects the address "FF0C". Then, after the reset is released, the CPU 41 generates the address "FF0C" as the reset vector address, reads the instruction (for example, "D000") from the address "FF0C", and sets it into the program counter. Thus, the CPU 41 executes the program from "D000".

On the other hand, when the cold/warm decision signal indicates the cold state, that is, when cold/warm decision signal is "0" (low level), and the reset terminal 11a is placed at the low level, the inverter 42a outputs the high-level signal, and the AND gate 42d outputs the high-level signal. Thus, the address selection circuit 42 selects the address "FFFC". Then, after the switch-on, the CPU 41 generates the address "FFFC" as the reset vector address, reads the instruction (for example; "C000") from the address "FFFC", and sets it to the program counter. Thus, CPU 41 executes the program from "C000".

Here, since the initial set data is retained in the warm start, the initial set after the warm start becomes unnecessary by selecting the different address as the reset vector address in response to the cold/warm decision signal. Thus, the initial setting routine can be skipped in this case, and hence the time needed for the initial set can be reduced.

As described above, the present embodiment 3 is configured such that the address selection circuit 42 selects the reset vector address in response to the cold/warm decision signal. Thus, the present embodiment 3 has an advantage of being able to reduce the time for the initial set in the warm start mode.

Embodiment 4

Figure 5:
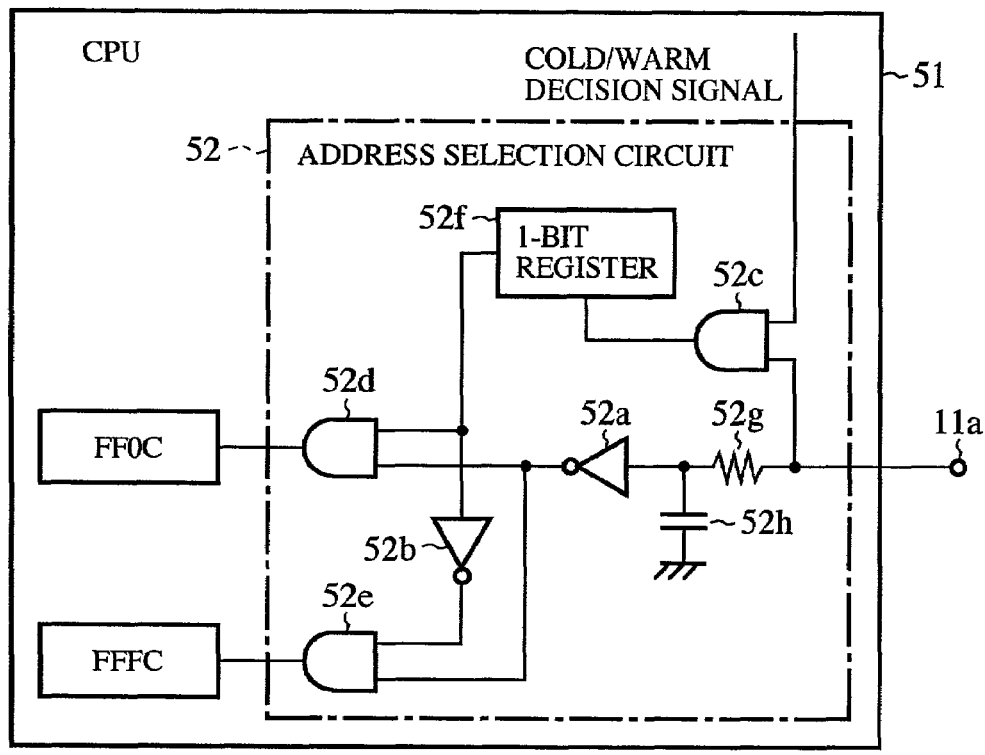
FIG. 5 is a circuit diagram showing a configuration of an embodiment 4 of the information processing unit in accordance with the present invention.

FIG. 5 is a circuit diagram showing a configuration of an embodiment 4 of the information processing unit in accordance with the present invention. FIG. 5 shows only a portion relevant to the present invention. In FIG. 5, the reference numeral 51 designates a CPU (information processing unit); and 52 designates an address selection circuit including inverters 52a and 52b, AND gates 52c–52e, and a 1-bit register 52f. The reset terminal 11a is connected to the inverter 52a via a resistor 52g and a capacitor 52h, and to the AND gate 52c. The AND gate 52c is supplied with the cold/warm decision signal described in the foregoing embodiment 3, and its output is supplied to the 1-bit register 52f. The 1-bit register 52f supplies its output to the AND gate 52d and to the AND gate 52e through the inverter 52b. The inverter 52a supplies its output to the AND gates 52d and 52e. The address selection circuit 52, receiving the cold/warm decision signal and the reset signal supplied to the reset terminal 11a, selects the reset vector address as will be described below.

Next, the operation of the present embodiment 4 will be described.

At power-up, the cold/warm decision signal indicates the cold state ("0", low level). In this case, the AND gate 52c outputs a low level signal ("0") regardless of the potential at the signal reset terminal 11a. As a result, the value "0" is set into the 1-bit register 52f as the initial value. Then, the initial value of the 1-bit register 52f is supplied to the AND gate 52d and to the AND gate 52e through the inverter 52b. In this case, when the potential at the reset terminal 11a is placed at the low level, the inverter 52a output a high-level signal, and the AND gate 52e outputs a high-level signal. As a result, the address selection circuit 52 selects the address "FFFC". Then, after the reset is released, the CPU 51 generates the address "FFFC" as the reset vector address, reads the instruction (for example, "C000") from the address "FFFC", and sets it into the program counter. Thus, the CPU 51 executes the program from "C000".

On the other hand, when the cold/warm decision signal becomes the warm state ("1", high-level), the value "1" is set into the 1-bit register 52f when the reset terminal 11a is not supplied with the reset signal (that is, when it is placed at the high-level). When the reset terminal 11a is supplied with the reset signal (low level) in this state, the inverter 52a outputs a high-level signal, and the AND gate 52d also outputs a high-level signal. Thus, the address selection circuit 51 selects the address "FF0C". Thus, the address selection circuit 52 selects the address "FF0C" when the reset signal is supplied during the operation of the CPU 51. Then, after the reset is released, the CPU 51 generates the address "FF0C" as the reset vector address, reads the address instruction (for example, "D000") from the address "FF0C", and sets it into the program counter. Thus, the CPU 51 executes the program from "D000".

In this way, the present embodiment 4 is configured such that it can select the reset vector address in accordance with the value stored in the 1-bit register 52f. Therefore, the present embodiment 4 can determine a desired reset vector address (address "FFFC" or "FF0C" in the foregoing example) at the warm start by setting a predetermined value (logical value 0 or 1) into the 1-bit register 52f by software.

Although the present embodiment 4 is described by way of example that selects one of the two reset vector addresses, this is not essential. For example, the address selection circuit can select one of three or more reset vector addresses by providing a plurality of 1-bit registers, and by selecting one of the reset vector addresses in accordance with the values set in these 1-bit registers.

As described above, the present embodiment 4 is configured such that it sets a bit value into a register in response to the cold/warm decision signal, and selects the reset vector address in accordance with the bit value set in the register. Therefore, the present embodiment 4 can select the reset vector address by software. In addition, it can also determine the reset vector address at the cold start.

Embodiment 5

Figure 6:
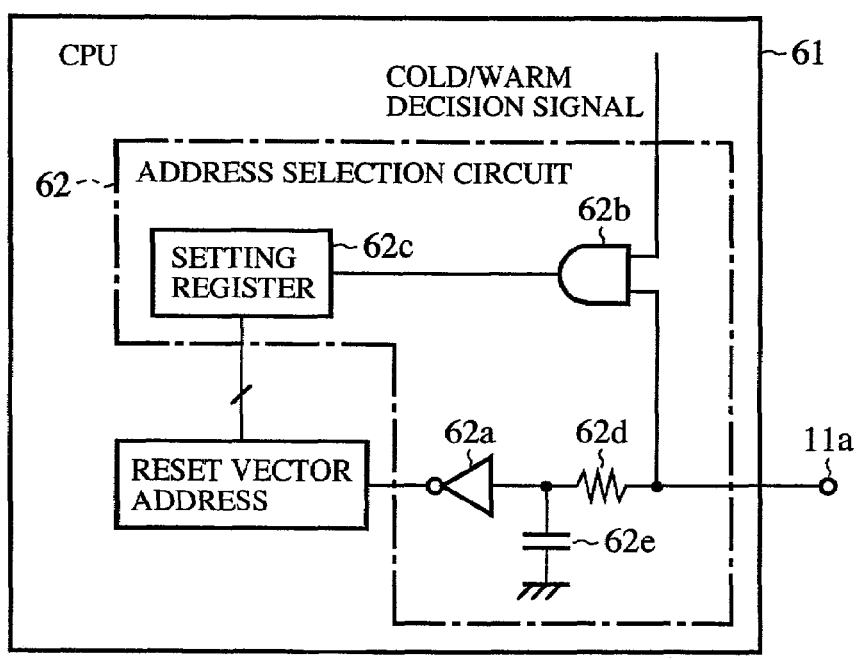
FIG. 6 is a circuit diagram showing a configuration of an embodiment 5 of the information processing unit in accordance with the present invention.
Figure 7:
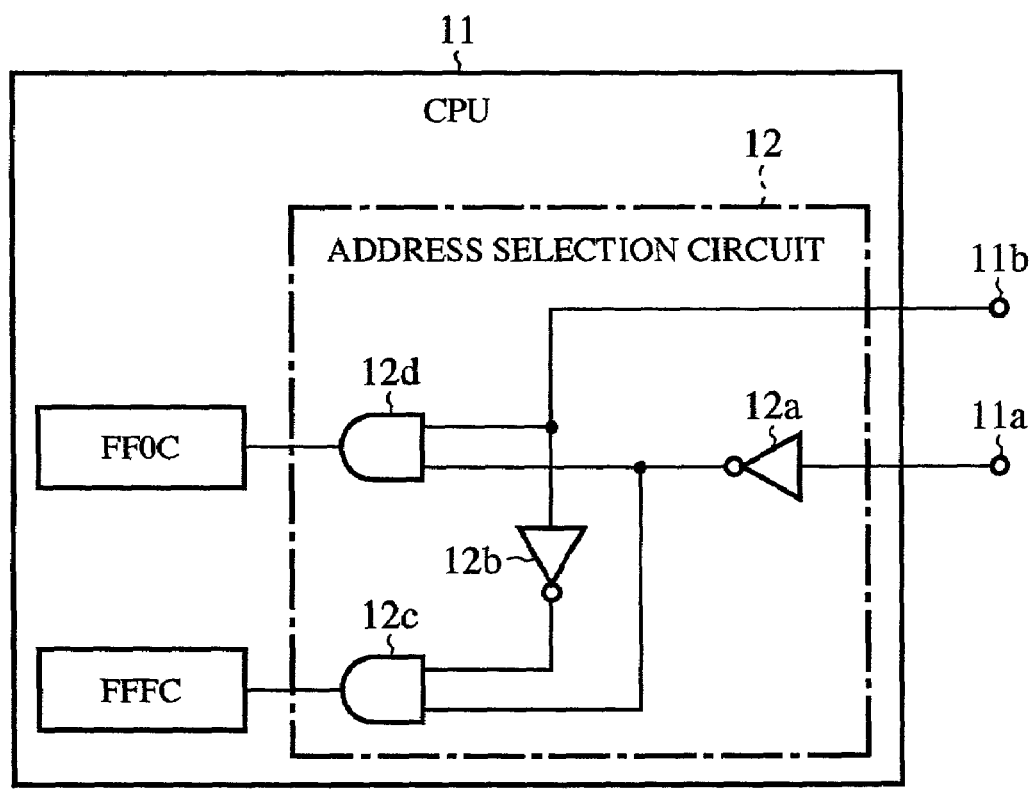
FIG. 7 is a circuit diagram showing a configuration of a conventional CPU.

FIG. 6 is a circuit diagram showing a configuration of an embodiment 5 of the information processing unit in accordance with the present invention. FIG. 6 shows only a portion relevant to the present invention. In FIG. 6, the reference numeral 61 designates a CPU (information processing unit); and 62 designates an address selection circuit including an inverter 62a, an AND gate 62b, and a setting register 62c with a plurality of bits. The reset terminal 11a is connected to the inverter 62a via a resistor 62d and a capacitor 62e, and to the AND gate 62b. The AND gate 62b is supplied with the cold/warm decision signal described in the foregoing embodiment 3, and the output of the AND gate 62b is supplied to the setting register 62c. The address selection circuit 62 selects the reset vector address in response to the value in the setting register 62c as will be described below.

Next, the operation of the present embodiment 5 will be described.

At power-up, the cold/warm decision signal indicates the cold state ("0", low level). In this case, the AND gate 62b outputs a low level ("0") signal regardless of the potential at the signal reset terminal 11a. As a result, all the bits of the setting register 62c are set at value "0" as the initial value.

In this case, when the potential at the reset terminal 11a is placed at the low level, the inverter 62a outputs a high-level signal. Thus, the reset vector address is selected in response to the value of the setting register 62c. Subsequently, the CPU 61 executes the instruction in accordance with the reset vector address selected.

On the other hand, when the cold/warm decision signal becomes the warm state ("1", high-level), the value "1" is set into any one of the bits of the setting register 62c when the reset terminal 11a is not supplied with the reset signal (that is, when it is placed at the high-level). When the reset terminal 11a is supplied with the reset signal (low level) in this state, the inverter 62a outputs a high-level signal so that the reset vector address is selected in response to the value in the setting register 62c. Subsequently, the CPU 61 executes the instruction in accordance with the reset vector address selected.

In this way, the present embodiment 5 is configured such that it includes a plurality of reset vector addresses, and selects one of the reset vector addresses in accordance with the set value in the setting register 62c. Accordingly, by setting a predetermined value into the setting register 62c by software, it can establish a desired reset vector address at the cold start.

As described above, the present embodiment 5 is configured such that it sets a register value into the setting register 62c in response to the cold/warm decision signal, and selects the reset vector address in accordance with the register value. Therefore, the present embodiment 5 has an advantage of being able to select the reset vector address by software. In addition, it offers an advantage of being able to determine the reset vector address at the cold start.

What is claimed is:

1. An information processing unit that executes an instruction specified by one of reset vector addresses at turn-on or at reset by a reset signal, the information processing unit comprising:
   storing means for storing reset associated information after turn-on and for outputting the reset associated information in response to the reset signal; and
   selecting means for selecting one of the reset vector addresses in accordance with the reset associated information output by the storing means.

2. The information processing unit according to claim 1, further comprising a reset selection terminal to which a selection signal for specifying one of the reset vector addresses is supplied, wherein
   the storing means comprises a latch circuit for latching a predetermined value as a latch value at turn-on; and
   the selecting means selects one of the reset vector addresses in response to the latch value held by the latch circuit and to the selection signal supplied via the reset selection terminal.

3. The information processing unit according to claim 2, wherein the latch value is a power supply voltage, and wherein the selecting means comprises a first AND circuit for selecting a first reset vector address in response to a logical AND of the latch value and the selection signal, and a second AND circuit for selecting a second reset vector address in response to a logical AND of the latch value and an inverted signal of the selection signal.

4. An information processing unit that executes an instruction specified by one of reset vector addresses at turn-on or at reset by a reset signal, the information processing unit comprising:
   storing means for storing reset associated information and for outputting the reset associated information in response to the reset signal; and
   selecting means for selecting one of the reset vector addresses in accordance with the reset associated information output by the storing means, wherein
   the storing means comprises a processor mode register for storing a software reset bit, and wherein
   the selecting means selects a first reset vector address when a reset processing is carried out by the reset signal, and selects a second reset vector address different from the first reset vector address when a reset processing is carried out by setting the software reset bit into the processor mode register.

5. An information processing unit that executes an instruction specified by one of reset vector addresses at turn-on or at reset by a reset signal, the information processing unit comprising:
   storing means for storing reset associated information and for outputting the reset associated information in response to the reset signal; and
   selecting means for selecting one of the reset vector addresses in accordance with the reset associated information output by the storing means, wherein the storing means comprises a register in the information processing unit for storing a cold start/warm start decision flag for making a decision as to whether to execute a cold start involving a reset processing at turn-on, or a warm start involving a reset processing by a reset signal during operation, wherein
   the information processing unit further comprises a cold/warm decision circuit for making a decision by the cold start/warm start decision flag as to whether the cold start or warm start is to be executed, and for outputting a cold/warm decision signal, and wherein
   the selecting means selects one of the reset vector addresses in response to the cold/warm decision signal when the reset signal is supplied.

6. The information processing unit according to claim 5, wherein the selecting means comprises a first AND circuit for selecting a first reset vector address in response to a logical AND of the reset signal and the cold/warm decision signal, and a second AND circuit for selecting a second reset vector address in response to a logical AND of the reset signal and an inverted signal of the cold/warm decision signal.

7. The information processing unit according to claim 5, wherein the selecting means comprises a register with at least one bit for holding the cold/warm decision signal, and selects the reset vector address in response to a value in the register when the reset signal is supplied.

* * * * *